United States Patent
Stemeseder et al.

(10) Patent No.: US 9,712,457 B2
(45) Date of Patent: *Jul. 18, 2017

(54) SERVER DIRECTED CLIENT ORIGINATED SEARCH AGGREGATOR

(71) Applicant: yelster digital gmbh, Vienna (AT)

(72) Inventors: Martin Stemeseder, Schneegattern (AT); Markus Wagner, Vienna (AT)

(73) Assignee: yelster digital GmbH, Vienna (AT)

( * ) Notice: Subject to any disclaimer, the term of this patent is extended or adjusted under 35 U.S.C. 154(b) by 156 days.

This patent is subject to a terminal disclaimer.

(21) Appl. No.: 14/047,765

(22) Filed: Oct. 7, 2013

(65) Prior Publication Data

US 2014/0136713 A1    May 15, 2014

Related U.S. Application Data

(63) Continuation of application No. 11/906,061, filed on Sep. 28, 2007, now Pat. No. 8,583,617.

(51) Int. Cl.
| | | |
|---|---|---|
| *G06F 7/00* | (2006.01) | |
| *G06F 17/30* | (2006.01) | |
| *H04L 12/911* | (2013.01) | |
| *H04L 29/08* | (2006.01) | |

(52) U.S. Cl.
CPC ...... *H04L 47/822* (2013.01); *G06F 17/30864* (2013.01); *H04L 67/2814* (2013.01); *H04L 67/2838* (2013.01)

(58) Field of Classification Search
None
See application file for complete search history.

(56) References Cited

U.S. PATENT DOCUMENTS

| | | |
|---|---|---|
| 6,766,361 B1 | 7/2004 | Venigalla |
| 6,912,514 B2 | 6/2005 | Matsushima et al. |
| 7,076,479 B1 | 7/2006 | Cheung et al. |
| | (Continued) | |

FOREIGN PATENT DOCUMENTS

WO    9812881    3/1998

OTHER PUBLICATIONS

About Clusty, http://clusty.com/about, Aug. 23, 2007, 8 pgs.
(Continued)

*Primary Examiner* — Tuan A Pham
(74) *Attorney, Agent, or Firm* — Lempia Summerfield Katz LLC

(57) ABSTRACT

A system for automated aggregation of search results provided in response to search queries/requests to multiple network resources is provided. The search requests are originated by client devices, at the direction of a server, to the various network resources. A user, using a client device, enters a search request that is provided to the server. The search request may include one or more search terms. The server identifies which network resources, out of a set of available network resources, are likely to provide relevant results to the user's query. The server may modify the search request to increase the likelihood that the search request will return relevant results. The identified list of resources is then provided back to the client device, along with the modified search request if applicable, which then originates and transmits the search request to each of the identified resources or subset thereof.

14 Claims, 7 Drawing Sheets

(56) References Cited

U.S. PATENT DOCUMENTS

| | | | |
|---|---|---|---|
| 7,171,415 B2 | 1/2007 | Kan et al. | |
| 7,206,767 B2 | 4/2007 | Matsushima et al. | |
| 7,216,121 B2 | 5/2007 | Bachman et al. | |
| 7,769,829 B1* | 8/2010 | Riggs | G06F 17/30053 709/219 |
| 2002/0007350 A1 | 1/2002 | Yen | |
| 2002/0078230 A1* | 6/2002 | Hals | G06F 17/30867 709/238 |
| 2002/0138439 A1 | 9/2002 | Matsushima et al. | |
| 2003/0037097 A1 | 2/2003 | Meyer et al. | |
| 2003/0158839 A1 | 8/2003 | Faybishenko et al. | |
| 2005/0154723 A1* | 7/2005 | Liang | G06F 17/30109 |
| 2005/0165688 A1* | 7/2005 | Matsushima | G06Q 30/06 705/52 |
| 2005/0165777 A1 | 7/2005 | Hurst-Hiller et al. | |
| 2005/0256847 A1 | 11/2005 | Karstens | |
| 2005/0262064 A1 | 11/2005 | Lavin | |
| 2006/0020662 A1* | 1/2006 | Robinson | G06F 15/16 709/203 |
| 2006/0080321 A1 | 4/2006 | Horn et al. | |
| 2006/0101012 A1 | 5/2006 | Carson et al. | |
| 2006/0167896 A1 | 7/2006 | Kapur et al. | |
| 2006/0218146 A1 | 9/2006 | Bitan et al. | |
| 2006/0265508 A1* | 11/2006 | Angel | H04L 29/12047 709/230 |
| 2006/0288001 A1 | 12/2006 | Costa et al. | |
| 2007/0016585 A1* | 1/2007 | Nickell | G06F 17/30864 |
| 2007/0078832 A1 | 4/2007 | Ott et al. | |
| 2007/0100962 A1* | 5/2007 | Barth | G06F 17/30867 709/217 |
| 2007/0130370 A1 | 6/2007 | Akaezuwa | |
| 2007/0185827 A1 | 8/2007 | Mrzyglocki | |

OTHER PUBLICATIONS

Bebo, http://www.bebo.com, Sep. 14, 2007, 4 pgs.
Classmates.com®, http://wwww.classmate.com/, Sep. 14, 2007.
Copernic: Software to search, find and manage information, http://www.copernic.com/index.html, Aug. 22, 2007. 6 pgs.
Freebase™ Alpha, http://www.freebase.com/signinl, Sep. 14, 2007, 2 pgs.
Friendster, http://web.archive.org/web/20070629114759/http://www.firendster.com, Sep. 14, 2007, 2 pgs.
Friendster®, http://www.friendster.com/, Sep. 18, 2007, 2 pgs.
Grokker—Enterprises Search Management and Content Integration, http://www.grokker.com/, Aug. 22, 2007, 4 pgs.
Jigsaw—Business Directory of Business Contacts and Company Information from Jigsaw, http:/jigsaw.com/, Sep. 14, 2007, 2 pgs.
Linkedin®, http://www.linkedin.com/, Sep. 14, 2007, 3 pgs.
Michael Arrington, "ProfileLinker Takes Meebo Approach to Social Networking", http://techcrunch.com/2006/12/28/profilelinker-takes-meebo-approach-to-social-networking/, Sep. 18, 2007, 18 pgs.
Myspace.com, http://www.myspace.com/, Sep. 14, 2007, 2 pgs.
Naymz: Reputation Management and Networking for professionals, http://www.naymz.com/, Sep. 14, 2007, 2 pgs.
Orkut beta, http://www.google.com/accounts/ServiceLogin?service=orkut&continue+http%3A%2F%2Fwww.orkut.com%FRedirLogin.as . . . , Sep. 14, 2007,1pg.
Peoplelookup.com, http://www.peoplelookup.com/, Sep. 14, 2007, 2 pgs.
Pipl—People Search (BETA), http://www.pipl.com/, Sep. 14, 2007, 4 pgs.
Reunion.com™, http://www.reunion.com/,Sep. 14, 2007, 3 pgs.
Spock Beta, http://spock.com/, Sep. 14, 2007, 1 pg.
StayFriends™, http://www.stayfriends.de/, Sep. 14, 2007, 2 pgs.
Streaker, http://www.streaker.com/, Sep. 14, 2007, 3 pgs.
The Main PeopleAggregatorNetwork, http://www.peopleaggregator.net/homepage.php, 4 pgs.
Upscoop, https://upscoop.com/, Sep. 14, 2007, 2 pgs.
Wink—Free People Search, http://wink.com/, Sep. 14, 2007, 2 pgs.
Xing, http:www.xing.com/, Sep. 14, 2007,3 pgs.
Yahoo! People Search, http://www.people.yahoo.com/, Sep. 14, 2007, 2 pgs.
Zabasearch, Free People Search and Public Information Search Engine, http://www.zabasearch.com/, Sep. 14, 2007, 1 pg.
Ziggs™, http://www.xiggs.com/, Sep. 14, 2007, 2 pgs.
ZoomInfo.com, http://www.zoominfo.com/, Sep. 14, 2007, 2pgs.
Eric J. Glover et al., "Architecture of a Metasearch Engine that Supports User Information Needs", Proceedings of the 8th International Conference on Information Knowledge Management, Nov. 1999, pp. 210-216.
Extended European Search Report in European Patent Application No. EP 08 165 214.1, dated Sep. 11, 2009, 7 pages.

* cited by examiner

FIG. 4

SERVER DIRECTED CLIENT ORIGINATED SEARCH AGGREGATOR

This application is a continuation under 37 C.F.R. §1.53(b) of U.S. patent application Ser. No. 11/906,061, filed Sep. 28, 2007, the entire disclosure of which is hereby incorporated by reference.

BACKGROUND

Manually locating particular information or resources on the Internet, and in particular, the world wide web, is an often cumbersome and inaccurate task due to the vast amount of information available as well as the highly distributed and unchecked organization thereof. To assist users, search engines, directories, portals and other similar information retrieval resources, collectively referred to as "network resources," may be provided. Network resources, such as search engines, are resources available on the Internet or other network, such as via a web page, that cache, aggregate, crawl, index, or otherwise create a directory of information available on the network, e.g. web sites, web pages, etc., and provide a method, such as a search interface/web page, by which a user may readily locate and access that information, such as by topic or key word searches or other means. The result typically includes a list of uniform resource locators (URL's), i.e. links, displayed on a web page and representative of the various web site or pages that the search engine has determined match the user's query. The list may be further augmented by advertising or paid link listings which the search engine is paid to display to the user. The user may then select one of the links to view the associated information, web page or site, the selection of which may also earn the search engine revenue, i.e. pay per click or click thru revenue.

Unfortunately, the lack of any centralized control in addition to the sheer volume of information that is available on a network, such as the Internet, coupled with limitations related to bandwidth and other resources and costs, creates a significant impediment to effective and efficient discovery and indexing of all, or even a subset, of the available information. Accordingly, in order to solve or even approach such a task, different network resources may employ different crawling/discovery, searching and/or indexing algorithms and/or methodologies and/or attempt to limit the scope, such as by topic, of the information to which they provide access.

The result is that no two network resources may return the same results for the same query and some network resources may be better suited to returning relevant results for a given search query than others. Further, the revenue generating strategies of a given search engine or other network resource, may skew the results that they provide, whether the user is aware or not, and/or augment the results with additional irrelevant content, making it more difficult for the user to locate results that they deem relevant. For the user, this necessitates executing their query across multiple network resources and manually reconciling the results thereof to sort out the relevant results and ensure that they are aware of as much of the available information relevant to their needs as possible.

BRIEF DESCRIPTION OF THE DRAWINGS

FIG. 4 depicts an alternative process flow of the system of FIG. 1.

DETAILED DESCRIPTION OF THE DRAWINGS AND PRESENTLY PREFERRED EMBODIMENTS

Figure 1:
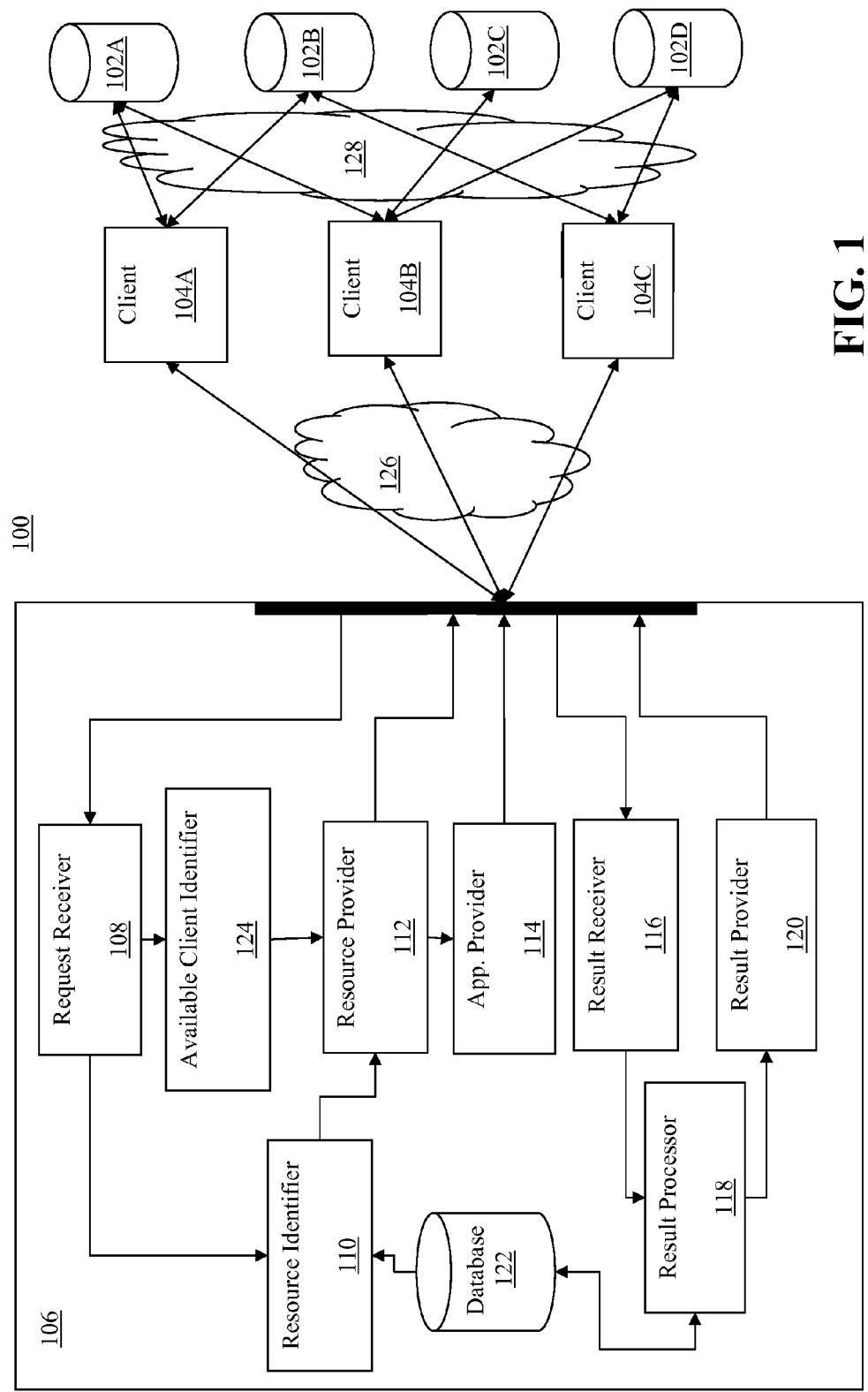
FIG. 1 depicts a block diagram of an exemplary system for originating search requests by client devices at the direction of a server according to one embodiment.

The disclosed embodiments relate to a system for automated aggregation, and possible augmentation, of search results generated or otherwise provided in response to search queries/requests to multiple network resources, such as search engines, the search requests being originated by client devices, at the direction of a server, to the various network resources. In one embodiment, a user, using a client device, enters a search request which is provided to the server. The search request, which may comprise one or more search terms, may be entered via a web based or client based interface/application provided via the client device. As will be described, the client device may be any device capable of accessing the server and network resources via a network, such as the Internet. Exemplary client devices include a computer, cell phone, personal digital assistant, network appliance, etc. The server identifies which network resources, out of a set of available network resources, are likely to provide relevant results to the user's query. The server may further modify the search request to increase the likelihood that the search request will return relevant results. The identified list of resources is then provided back to the client device, along with the modified search request if applicable, which then originates and transmits the search request to each of the identified resources or subset thereof. The search results may then be received and presented to the user by the client device. Alternatively, the search results may be passed to the server which processes the search results and then provides the processed search results back to the client device for presentation to the user.

In one embodiment, a client application is provided to the client device which operates to receive the identified resources from the server and originate and transmit the search requests thereto. The client application may also operate to receive the search results from the network resources to which the search requests were directed and present them to the user and/or pass the search results to the server for processing and then obtain and present the processed search results to the user. The client application may further act as an interface between the user and the server, such as by providing a graphic user interface through which the user may input search requests and view search results. The client application may interact with the server using a protocol such as the HTTP protocol or other suitable protocol to implement the disclosed functionality. In one embodiment, the client application may augment the search request, such as by adding tags indicative of a search context to the search request before sending the search request to the server which may then factor in the search context in the identification of network resources. Exemplary tags may identify the type of client device, e.g. cell phone or computer, the capabilities of the client device, e.g. graphics, audio or bandwidth capabilities, the geographic location of the device, e.g. geo-tag, or combinations thereof. In an alternative embodiment, the client application may indicate to the server when the client device is idle or otherwise has available processing and/or communications resources. The server may then leverage available client devices to originate and transmit search requests to some or all of the identified network resources thereby alleviating the requesting client device of having to originate and transmit all of the search requests and/or increase the number of search requests that can be transmitted by distributing the load among multiple client devices. Upon receipt of the search results, the client devices may pass the search results back to the server for aggregation and presentation to the requesting user.

Search aggregation, also known as meta-searching, refers to automatically running a search query across multiple search engines and aggregating the results to take advantage of the different searching and indexing algorithms/methodologies of the search engines. Search aggregation may be performed by a web based resource or by a client application which executes on the user's computer. In either case, a user enters a query and the search aggregator then sends a search request to each of a set search engines. The received results are then aggregated together, such as to remove duplicate results, and presented to the user.

Web based search aggregation services are advantageous as they are accessible via a non-proprietary web browser program available, usually free, to most users and therefore do not require that the user install any additional/proprietary software on their computer. Such aggregation services are also easier to maintain due to their centralized nature and can take advantage of higher bandwidth communications channels, typically available to web servers at the "core" of the Internet, to initiate search requests than may be available to the user. See, for example, Grokker available at http://grokker.com and published by Groxis Inc; Clusty available at http://clusty.com and published by Vivisimo, Inc. Unfortunately, initiating search requests to various network resources on behalf of multiple users may have a significant impact on the resources of those target network resources and may possibly even violate the terms of service under which the network resources make their services available. Given that the search aggregation web site must launch all of its search requests from a logically-central location, such requests may be easily identified, such as by their originating network address, and blocked by the target network resources. Further, depending upon the volume of search requests being generated, even the higher bandwidth communications links, like those available to a centralized search aggregator, may eventually become saturated, thereby impeding overall performance.

Client based search aggregation applications, such as Copernic Agent, available from Copernic Inc., avoid the issue of being easily identified by the target search engines. However, such applications require the user to install proprietary software, usually for a fee, and are more difficult to maintain, requiring the distribution of upgrades, updates or patches to maintain operation. Further, typical users and their associated devices, usually access the Internet at the "edge" where bandwidth is low-cost but also limited as compared to the "core" infrastructure of the Internet. Accordingly, the ability to initiate multiple search requests to multiple target search engines is limited as these communication links may quickly become saturated.

Further both web and client based search aggregators send search requests to a fixed set of network resources known to the search aggregator. This may result in a particular search request being sent to a search engine which is unlikely to provide relevant results, such as due to particular limitation in the its indexing or searching algorithms or topical scope.

Figure 2:
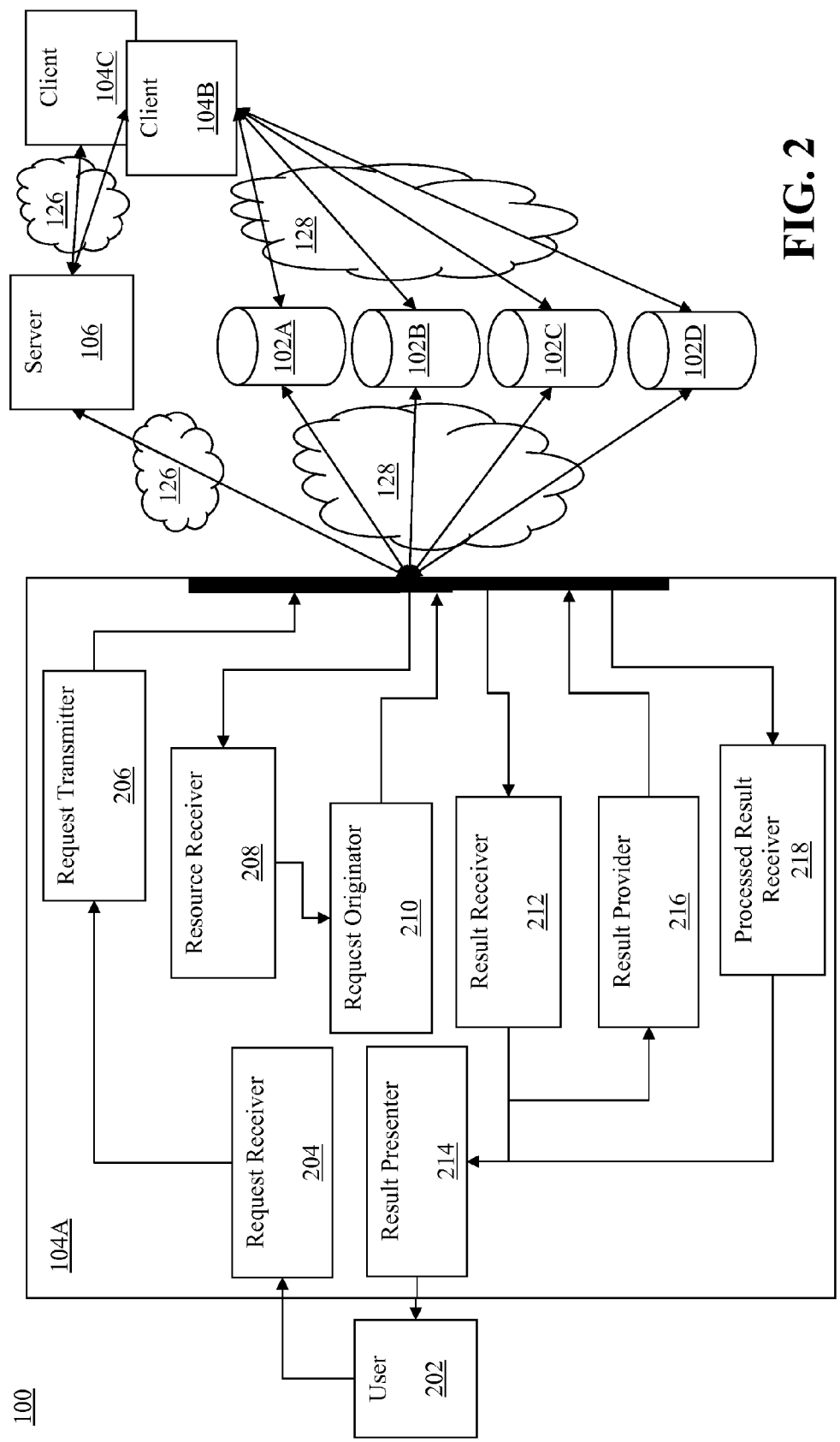
FIG. 2 depicts a block diagram of an exemplary client device for use with the system of FIG. 1, according to one embodiment.

Referring now to the figures, FIG. 1 depicts a block diagram of an exemplary system 100 for originating search requests by client devices 104A, 104B, 104C at the direction of a server 106 according to one embodiment. For example, a user accesses a central server 106 to initiate an aggregated search of at least a subset of network resources 102A, 102B, 102C, 102D, the central server 106 then causing the client device 104A, 104B, 104C to initiate the search to that subset of network resources 102A, 102B, 102C, or at least a portion thereof. The client devices 104A, 104B, 104C, described in more detail with respect to FIG. 2, are coupled with the server 106 and the network resources 102A, 102B, 102C, 102D via networks 126, 128. Herein, the phrase "coupled with" is defined to mean directly connected to or indirectly connected through one or more intermediate components. Such intermediate components may include both hardware and software based components.

The client device 104A, 104B, 104C may include a personal computer, personal digital assistant, cellular telephone, Internet appliance, or other wired or wireless device, along with suitable software, capable of accessing the disclosed functionality, via the networks 126, 128 or otherwise. The client device 104A, 104B, 104C may execute a non-proprietary interface application (not shown), such as a web browser program, e.g. Internet Explorer published by Microsoft Corporation or Firefox published by Mozilla, to implement the disclosed functionality. Alternatively, or in addition thereto, a proprietary client application (not shown), described in more detail below, may be provided which implements some or all of the disclosed functionality, alone or in concert with a web browser application, on the client device 104A, 104B, 104C.

The networks 126, 128 may include any public or private, wired or wireless network or combinations thereof. In one embodiment, the networks 126, 128 are the same network, such as the Internet. In an alternate embodiment, the network 126 coupled between the clients 104A, 104B, 104C and the server 106, includes a private network, such as a virtual private network implemented via a public network or other proprietary network, while the network 128 between the clients 104A, 104B, 104C and the network resources 102A, 102B, 102C, 102D is a publicly accessible network, such as the Internet. It will be appreciated that the network 128 may also be a private or proprietary network in implementations of the disclosed embodiments that are wholly within a private enterprise.

The network resources 102A, 102B, 102C, 102D include web sites, search engines, data repositories, human agents, directory services, meta search engines, content aggregators, or other information resources available via the network 128, or combinations thereof. In one embodiment, the network resources 102A, 102B, 102C, 102D are publicly available information resources. Alternatively, the network resources 102A, 102B, 102C, 102D may be proprietary or otherwise non-public information sources, or combinations of public and non-public information resources. In one embodiment, the client devices 104A, 104B, 104C, 104D or server 106 may also be network resources 102A, 102B, 102C, 102D, such as where the client devices 104A, 104B, 104C further include data repositories, such as file sharing databases, etc., or where the server 106 is itself a search engine with its own information repository, as will be described.

In contrast to the web based search aggregators described above, by originating the search requests to the various network resources 102A, 102B, 102C, 102D from the client device 104A, 104B, 104C, the requisite bandwidth utilization of multiple users is distributed across multiple limited-capacity communication channels rather than being concentrated over a limited set of limited-capacity, albeit likely higher capacity, and higher cost, channels, thereby improving the user experience and minimizing the bandwidth requirements of the server. Further, outages of portions of the networks 126, 128 may be at least partially circumvented by distributing the origination of search requests thereby improving the service availability. Origination of search requests by the client device 104A, 104B, 104C also masks the centralized direction and control of the server 106 from the various network resources 102A, 102B, 102C, 102D by taking advantage of the appearance of each search request to the network resource 102A, 102B, 102C, 102D as having been originated by the client device 104A, 104B, 104C, thus thwarting attempts to block such requests. Each network resource 102A, 102B, 102C, 102D, thereby, sees a distribution of request sources rather than a concentration thereof which may be perceived to be a threat, such as a distributed denial of service attack ("DDOS"), to the network resource or otherwise a violation of the terms under which the resource 102A, 102B, 102C, 102D is made available on the network, or a violation of regulatory, legal or administrative restrictions. Advantageously, the appearance of the search request to come from the user/client device 104A, 104B, 104C who, in fact, is originating the request, preserves the integrity of any metrics that the network resource 102A, 102B, 102C, 102D may be monitoring, such as those used to gauge unique visitors, compute advertising revenue, etc. Unauthorized copying or modification, or the detection or accusation thereof, of content provided by the network resources 102A, 102B, 102C, 102D may further be avoided or concealed. Framing or otherwise presenting results in a context or manner dictated by the network resource 102A, 102B, 102C, 102D may also be avoided. This permits selective aggregation and/or customized presentation of relevant content while avoiding irrelevant content such as advertising, extraneous links (contact us, help, etc.), surveys, etc. Further, malicious content or links thereto, such as virus, adware, or spyware programs and the like, may be filtered out. The disclosed embodiments act as agent on behalf of the user but at the direction of the server 106, and as such, operate within the boundaries of the terms of service and generally accepted guidelines of the network resources 102A, 102B, 102C, 102D.

In one embodiment, the system 100 is provided by a service provider (not shown) to users who are customers of the service provider. The service provider may charge the customers for use of the system 100 or seek other compensation for the use thereof, such as a one time or subscription based fee. Alternatively or in addition thereto, the system 100 may be provided/operated by a business or other entity for the benefit of internal customers. In another alternative embodiment, the service provider may allow third party advertisers to pay for the display of advertisements to users who use the system 100, such as by having their advertisements inserted into the search results as will be described in more detail below. Alternatively, the service provider may earn income based on users who select/click on particular search results, e.g. "pay-per-click" or "click thru" revenue.

In yet another alternative embodiment, the service provider may provide basic services to users in accordance with the disclosed embodiments and further offer additional (cross-sell), upgraded/improved (up-sell) services and/or additional features or options on a fee basis. In one embodiment, the server 106 provides a web site or web service executing on a web server and accessible by users via the network 126 using a web browser program, such as Internet Explorer published by Microsoft Corporation, located in Redmond, Wash. Other browser programs may also be used, such as Firefox, published by the Mozilla Organization, or mobile web browser programs used by mobile platforms. Alternatively, or in addition thereto, other forms of access to the server 106 may be provided such as via electronic mail, or short message service ("SMS"), also known as text messages, multimedia message service ("MMS"), mobile web browser or client, such as in a native format or according to the Wireless Application Protocol ("WAP") or other mobile client/platform implementation, e.g. Binary Runtime Environment for Wireless ("BREW") or Java Platform, Micro Edition ("J2ME" or "Java ME") based. As will be described below, the system 100 may utilize a client application provided to the client device 104A, 104B, 104C to implement the disclosed functionality. This client application may be provided for free or for a fee.

An exemplary service provider is 123 People, available via the Internet at www.123people.com, which is a service directed to the search for information about people, such as the characteristics of a person, a people, a culture, a society, a community, a mutual interest of a people, culture, society or community, or combinations thereof. With even conservative estimates declaring that a significant percentage of today's web searches are for a person's name, it is clear that finding people, and information thereabout, is more important than ever for today's Web users. While no longer separated by geography, global contacts are now separated by page rank and the niche social network they chose to join; they may be lost in unwieldy pages of disorganized information that often has little relevancy to the people they are looking to find information about. It will be appreciated that implementations of the disclosed embodiments need not be limited to people information, but may be focused on other general topics of interest such as real estate, automobiles, etc. or may not be limited to any one topic but instead be of a general nature providing information on any topic requested by the user. 123 People comprises a platform that, beyond "indexing everyone in the world," changes the way Web users search for people information. As will be described with respect to the disclosed embodiments, 123 People's search functionality launches multiple simultaneous multi-platform queries that search the Web for information and rich media content. Interactive tools including voting, tagging and commenting may further be provided to allow users to add perspective on profiles and see what other users have added to their profiles. SMS-based search and other mobile/wireless access capabilities may allow users to instantly download people information on-the-go from any mobile phone.

According to one embodiment, 123people is an online people search service that has two main search functions:

1. 123people acts as a search engine that crawls social network sites such as linkedin.com, facebook.com or myspace.com like other search engines (google.com, yahoo.com, etc.) and indexes the publicly available content; and 2. 123people utilizes a decentralized search origination methodology, such as via a client application installed on the user's computer. This decentralized search origination methodology triggers the user's client device 104A, 104B, 104C to search additional network resources 102A, 102B, 102C, 102D available via the Internet by, for example, directly utilizing the search-input-fields on various websites (e.g. youtube.com, google.com, ebay.com, itunes, etc.), or via other means such as application program interface. By doing so, 123people acts as a meta-search engine, utilizing various internet search sites and huge content databases available via the Internet, however the search requests themselves are decentralized, originating from the client device 104A, 104B, 104C rather than the 123people server 106. The 123people server 106, for example, tells the local client software at the user's PC which resources should be searched, depending on the users search terms. For example, if the user enters "Al Gore" into the website, the server 106 tells the client application to search the Wikipedia.com and Amazon.com web sites by, for example, interacting with the search functions provided by these sites, as Al Gore is a celebrity and therefore there is a substantial likelihood that there will be entries in Wikipedia's database as well as books written by him available from Amazon.com, etc.

The overall results of the search may be passed to and displayed on the 123people website, such as in an aggregated, modified and/or clarified form, and/or presented via the client application on the client device 104A, 104B, 104C.

The server 106 includes a request receiver 108, resource identifier 110 and resource provider 124. It will be appreciated that the server 106 may be implemented in hardware, software or a combination thereof, and that one or more of the components thereof may be combined or, alternatively, sub-divided into other functional units, to implement the described functionality. Further, the system 106 may include other hardware and/or software components which are not shown, such as a suitable network interface for interfacing with the network 126. In one embodiment, the described functionality is implemented in computer program logic stored in a memory device, such as a computer memory or computer storage device, and executable by one or more processors to implement the described functionality. For example, the described functionality may be implemented on a web server as one or more network accessible web pages coupled with suitable back-end logic.

The request receiver 108 is operative to receive a request to initiate a search from a client device 104A, 104B, 104C associated with a user 202 and remote from the server 106, the request comprising at least one search term. The search term, or query, is typically a word, phrase or group of words possibly combined with other syntax characterizing the information a user is seeking. Alternatively, a search request may indirectly specify a search term, such as by referencing a previous search request or selecting from a list of pre-defined search requests. In embodiments, utilizing a client application provided to the client device 104A, 104B, 104C, the request receiver 108 is further operative to receive the request to initiate the search from the client application (not shown), the client application being operative to receive the request to initiate the search from the user 202, such as via a graphic user interface, e.g. a pop up input window, etc., and provide the request to the request receiver 108, such as via the network 126. The request may be provided to the request receiver 108 using the HTTP protocol, such as via a HTTP POST operation. It will be appreciated that other HTTP mechanisms or other suitable protocols may be used.

The server 106 also includes a resource identifier 110 coupled with the request receiver 108 and operative to identify, based on the request, a first subset of the plurality of network resources 102A, 102B, 102C, 102D to which a search request should be directed based on the at least one search term. In one embodiment, the resource identifier 110 is coupled with a database 122 which stores identifications of available network resources 102A, 102B, 102C, 102D, such as by key-word association. The resource identifier 110 may extract keywords from the search request and compare them with the keyword associations in the database 122, thereby retrieving the associated network resource 102A, 102B, 102C, 102D identifications. Alternatively, other methodologies may be used to relate the search request to a select set of network resources 102A, 102B, 102C. In one embodiment, the resource identifier 110 is further operative to determine which of the plurality of network resources 102A, 102B, 102C, 102D are likely to provide relevant results in response to a search request for the at least one search term. For example, the database 122 may further store characteristic information relating to each of the available network resources 102A, 102B, 102C, 102D, such as their topical scope or known likelihood to provide information relevant to particular topics. Using keyword comparison or other analysis, the search request is related to these characteristics to determine those network resources 102A, 102B, 102C, 102D that are more likely to provide relevant results. It will be appreciated that database 122 may actually comprises multiple databases, internal or external to the server 106, and may further include human actors (not shown) which review search requests and recommend particular network resources 102A, 102B, 102C, 102D to be searched.

To further narrow the scope of a search and/or constrain the results thereof, the server 106 may allow the user 202 to specify, or the server 106 may otherwise derive from the user 202, a context in which to constrain the search request, either to constrain the selection of network resources 102A, 102B, 102C, 102D and/or filter the received results. Alternatively, the system 100 may be self-limited to a particular context, such as people, entertainment, automobiles, real estate, etc. and thereby the user need not explicitly specify a context as their use of the system 100 implicitly specifies the context. Context may include factors which systematically determine the form, meaning, appropriateness or translation of a search for a particular query/set of search term(s) and/or the background information that enhances understanding of technical and business environments to which the search results relate, or the set of facts or circumstances that surround a situation or event. Context may be specified explicitly, wherein the user 202 specifies the context, or derived implicitly, for example based on the source or type of client device 104A, 104B, 104C that the user 202 is using to initiate search, or the capabilities thereof, such as a mobile device. For example, the user 202 may be looking for a retail store in a particular city. Implicit context derivation may rely on tags, such as geo-tags which, for example, indicate the location of the client device 104A, 104B, 104C. For example, where the user 202 is accessing the system 100 from a mobile client device 104A, 104B, 104C, such as a cell phone or GPS device, the client device 104A, 104B, 104C, or the client application executing thereon, may derive the geographic location of the device 104A, 104B, 104C, such as from the device's 104A, 104B, 104C GPS or cellular locating functionality, and include it with, such as by appending it to, the search request. Where the user is looking for a retail store, the geo-tag can be used to provide only those search results that are geographically proximate. Particular network resources 102A, 102B, 102C, 102D may be limited to certain self-imposed contexts based on their topical scope and the server 106 may be aware of these limitations, such as via the database 122. In one embodiment, the resource identifier 110 is further operative to identify, via key words, tags or other explicit or implicit specifications, a search context and determine, such as by using the database 122, which of the plurality of network resources 102A, 102B, 102C, 102D are likely to provide relevant results in response to a search request for the at least one search term in relation to the search context. For example, the database 122 may store identifications of network resources 102A, 102B, 102C, 102D along with specifications of the contexts of the information they provide or provide access to. The search context may include a geographic context, a demographic context, topical context, other context characterizing what results the user would likely perceive as relevant, or combinations thereof. For example, the search context may include a characteristic of a people, a culture, a society, a community, a mutual interest of a people, culture, society or community, or combinations thereof.

Based on the search context or otherwise, the server 106 may identify a goal of the user 202 in performing their search and modify the search to achieve, i.e. cause the network resources to return, results that more closely approximate the user's goal. For example, if the user 202 is searching within a particular context, such as geographic context, the server 106 may modify the search request to include geographic search terms which would cause the selected network resources 102A, 102B, 102C, 102D to return results more commensurate with the search context. In particular, the server 106 may identify a goal of the user 202 in performing their search and select the subset of network resources that are most likely to provide results that closely approximate or meet the user's 202 goal. This further improves the user experience, e.g. fewer more relevant results require less post processing and/or interpretation to derive or otherwise separate relevant results from irrelevant results, less utilization of available bandwidth, such as a limited bandwidth connection, e.g. cellular, reduces the burden on the network resources 102A, 102B, 102C, 102D by targeting only those network resources 102A, 102B, 102C, 102D likely to provide the desired results, etc. Such identification may be based on rules or other parameters which may be easily maintained at the server as opposed to a client side application which would require periodic updates if the network resources 102A, 102B, 102C, 102D change. In one embodiment, the resource identifier 110 is further operative to modify the at least one search term to attempt to cause the identified first subset of network resources 102A, 102B, 102C, 102D to provide relevant results in response thereto. The resource provider 112, described in more detail below, is further operative to provide the modified at least one search term back to the client device 104A, 104B, 104C, such as via the HTTP protocol, whereby the originated search requests include the modified at least one search term. Effectively, the server 106 leverages a centralized knowledge base to enhance clarify and refine the user's 202 search request to attempt to cause the selected network resources 102A, 102B, 102C, 102D to provide more relevant results than if the user 202 had individually accessed each network resource 102A, 102B, 102C, 102D on their own.

The server 106 further includes a resource provider 112 coupled with the resource identifier 110 and operative to provide, such as via the HTTP or other suitable protocol, at least a portion of the identified first subset of network resources 102A, 102B, 102C, 102D to the client device 104A, 104B, 104C. The provision of the identified network resources 102A, 102B, 102C, 102D causes, in response thereto, the client device 104A, 104B, 104C to originate a search request, based on the at least one search term, for transmission to at least one of the network resources 102A, 102B, 102C, 102D of the identified first subset. For example, using the Hypertext Transport Protocol ("HTTP"), the client device 104A, 104B, 104C, 104D may create and transmit HTTP GET requests to each of the identified network resources 102A, 102B, 102C, 102D or otherwise interact or establish sessions therewith, to send the search request and cause the network resources 102A, 102B, 102C, 102D to provide their results in response. It will be appreciated that the type of search request that is created by the client device 104A, 104B, 104C depends on the type of, or communication protocol used by, the network resources 102A, 102B, 102C, 102D and may include HTTP, FTP, NNTP, SMTP, or other non-proprietary or proprietary protocols. For example, where the network resource 102A, 102B, 102C, 102D is an FTP server, the client device 104A, 104B, 104C may create and transmit an FTP request. Any search request type or protocol which the client device 104A, 104B, 104C could originate on its own may be supported by the disclosed embodiments. As was discussed above, advantageously, each search request appears to each of the network resources 102A, 102B, 102C, 102D of the identified first subset to have been originated from the client device 104A, 104B, 104C and not the server 106. In effect, the client device 104A, 104B, 104C is proxying search requests on behalf of the server 106.

As was discussed above, the disclosed embodiments may utilize a client application (not shown) provided to the client device 104A, 104B, 104C in advance of, or at the time of, the initiation of a search by the user 202. The client application is responsive to the server 106 to originate the requisite search requests to the various network resources 102A, 102B, 102C, 102D. For example, the client application may interact with the identified network resources 102A, 102B, 102C, 102D, e.g. interact with the search query input of a search engine via HTTP or other protocol interactions, to transmit the search request and cause the network resource 102A, 102B, 102C, 102D to provide results responsive thereto. The client application may further serve as an interface between the user 202 and the server 106 and may further operate to present the results, modified by the server 106 or not, returned in response to the search requests, as will be described in more detail below. The client application may be any software program suitable to implement the disclosed functionality and may include a separate executable program, a browser executable, such as plug-in or module, or program code, instructions or commands provided by the server which controls the client device 104A, 104B, 104C. In one embodiment, the client application is a browser plug-in or module which is accessible at any time by the user, such as via a pop-up menu, to receive search requests in accordance with the disclosed embodiments, such as while the user is viewing or otherwise surfing various web sites or pages. In one embodiment, the server 106 includes a client application provider 114 operative to provide a client application to the client device 104A, 104B, 104C to be executed thereon, the client application being operative to cause the client device 104A, 104B, 104C to originate each of the search requests. The client application provider 114 may be a browser accessible web page from which the user 202 can download the client application. Alternatively, the client application provider 114 may automatically provide the client application to the client device 104A, 104B, 104C at the time of, or in advance of the user 202 initiating a search request to the server 106. It will be appreciated that the client application provider 114 may distribute the client application via other means, such as by electronic mail or otherwise include it with other applications that the user 202 may download, with or without the user's 202 explicit or implicit permission. Where the client application has previously been provided to the client device 104A, 104B, 104C, the client application provider 114 may, at the time that the user 202 initiates a search request, verify that the client device 104A, 104B, 104C has the latest version of the client application and, if not, provide an updated version of the client application to the client device 104A, 104B, 104C. As was described above, the client application, or an upgraded version thereof, may be provided for a fee.

Subsequent to the client device 104A, 104B, 104C transmitting the search requests to the identified network resources 102A, 102B, 102C, 102D, the network resources 102A, 102B, 102C, 102D will generate results responsive thereto. In one embodiment, the results are transmitted back to the client device 104A, 104B, 104C, such as via an HTTP based response, which may present the results to the user 202 and/or provide the results back to the server 106 for processing as will be described. Alternatively, redirection may be employed to cause the results to be sent directly to the server 106. In one embodiment, the server 106 may receive and post-process the results of the search to modify, enhance or augment the results, such as to provide value-added services or otherwise further tailor and/or aggregate the results to meet or more closely approximate the user's goal or constrain the results within the explicitly or implicitly specified context. Results may be augmented with additional results retrieved from the server itself, such as from the database 122 or other internal database or from additional network resources.

In one embodiment, the server 106 includes a result receiver 116 operative to receive, such as from the client device 104A, 104B, 104C, redirection or interception, a result based on the search request from each of the of network resources 102A, 102B, 102C, 102D of the identified first subset having received the search request. The server 106 further includes a result provider 120 coupled with the result receiver and operative to provide each result to the client device for presentation to the user. In another embodiment, the server 106 includes a result processor 118 coupled between the result receiver 116 and result provider 120 and operative to process the received result such as by modifying the results, enhancing results, augmenting the results or combinations thereof. For example, the received results may be processed to remove duplicative results, remove advertisements or other irrelevant content, reformat the results to more clearly present them to the user 202, or combinations thereof. In one embodiment, the result processor 118 is coupled with the database 122 or another database from which additional results may be derived to enhance or augment the results received from the network resources 102A, 102B, 102C, 102D. For example, the server 106 may operate as a search engine or network resource itself wherein the database 122 stores the information that is catalogued, cached or otherwise indexed.

As will be appreciated, many users 202 may utilize the services of the system 100 at any given time and there may be many other users 202 who have used the system 100 in the past, and may use it again in the future, but are not presently using the system 100. In one embodiment, the client devices 104A, 104B, 104C of the users 202 who are not presently utilizing the system 100, i.e. their idle client devices 104A, 104B, 104C, may be leveraged for their additional processing and/or communication capacity on behalf of active users 202 and their associated client devices 104A, 104B, 104C, i.e. requesting client devices 104A, 104B, 104C. Such utilization of idle client devices 104A, 104B, 104C to assist requesting client devices 104A, 104B, 104C may be with explicit or implicit user 202 permission, such as by way of the terms of service of the system 100.

In one embodiment, the server 106 further includes an available client identifier 124 operative to identify at least one other client device 104A, 104B, 104C available to originate a search request, based on the at least one search term, for transmission to at least one of the network resources 102A, 102B, 102C, 102D of the identified first subset. Availability may be determined based on whether the client device 104A, 104B, 104C is presently turned on, connected to a network 126, 128, not being utilized by a user 202, presently has excess processing and/or communications capacity, or combinations thereof. In one embodiment, the user 202 may specify one or more conditions under which their associated client device 104A, 104B, 104C is available to the server 106. Availability may be determined by the available client identifier 124 by periodically polling the various participating client devices 104A, 104B, 104C or, alternatively or in addition thereto, the participating client devices 104A, 104B, 104C may report their availability to the available client identifier. In one embodiment, the client application provided to the client device 104A, 104B, 104C is further operative to determine the availability of the client device 104A, 104B, 104C and report such to the available client identifier 124. The resource provider 112 is further coupled with the available client identifier 124 and further operative to provide at least a portion of the identified first subset to the at least one other client device 104A, 104B, 104C to cause, in response thereto, the at least one other client device 104A, 104B, 104C to originate a search request, based on the at least one search term, for transmission to at least one of the network resources 102A, 102B, 102C, 102D of the identified first subset.

In addition, the result receiver 116 may be further operative to receive at the server 106, via the client device 104A, 104B, 104C and the at least one other client device 104A, 104B, 104C, a result based on the search request from each of the network resources 102A, 102B, 102C, 102D of the identified first subset having received the search request. The result processor 118 coupled with the result receiver 116 may be further operative to process the received results as described above, such as by aggregating the results from the various client devices 104A, 104B, 104C, and the result provider 120 coupled with the result processor 118 may then be further operative to provide the processed results to the requesting client device 104A, 104B, 104C for presentation to the user.

FIG. 2 depicts a block diagram of an exemplary client device 104A, 104B, 104C for use with the system 100 of FIG. 1, according to one embodiment. The client device 104A, 104B, 104C includes a request receiver 204, request transmitter 206, resource receiver 208 and request originator 208. The request transmitter 206 is operative to transmit a request to the server 106 to initiate a search, the request comprising at least one search term, as described above. The client device 104A, 104B, 104C further includes a resource receiver 208 operative to receive, from the server 106, based on the request, identification of a first subset of the plurality of network resources 102A, 102B, 102C, 102D to which a search request should be directed based on the at least one search term. In addition, the client device 104A, 104B, 104C includes a request originator 210 coupled with the resource receiver 208 and operative to originate a search request, based on the at least one search term, for transmission, such as by establishing HTTP session, to at least one of the network resources 102A, 102B, 102C, 102D of the identified first subset as described above.

In accordance with the functionality described above, the client device 104A, 104B, 104C may further include a result receiver 212 operative to receive the results responsive to the search requests from the network resources 102A, 102B, 102C, 102D and a result presenter 214 coupled therewith to present the received results to the user 202, such as via a graphic user interface and display coupled with the client device 104A, 104B, 104C. Alternatively, the client device 104A, 104B, 104C may include a result provider 216 which provides or forwards the received results to the server 106 for processing and a process result receiver 218 to receive the processed results back from the server 106. The processed result receiver 218 may be coupled with the result presenter 214 to present the results to the user 202.

In an alternative embodiment, the client device 104A, 104B, 104C may include logic (not shown), which operates transparent to the user 202 or otherwise, to alert or otherwise respond to the server 106 with a determination as to whether the client device 104A, 104B, 104C is available to originate search requests on behalf of another requesting client device 104A, 104B, 104C as was described above. This logic may monitor whether client device 104A, 104B, 104C is presently being utilized by the user 202 for any purpose and/or monitor the present excess capacity to process and/or transmit search requests alone or in concert with user specified preferences regarding the use of the client device 104A, 104B, 104C.

In one embodiment, some or all of the above described components and/or functions of the client device 104A, 104B, 104C may be provided by a client application, as described above, a non-proprietary browser program, or combination thereof.

Figure 3:
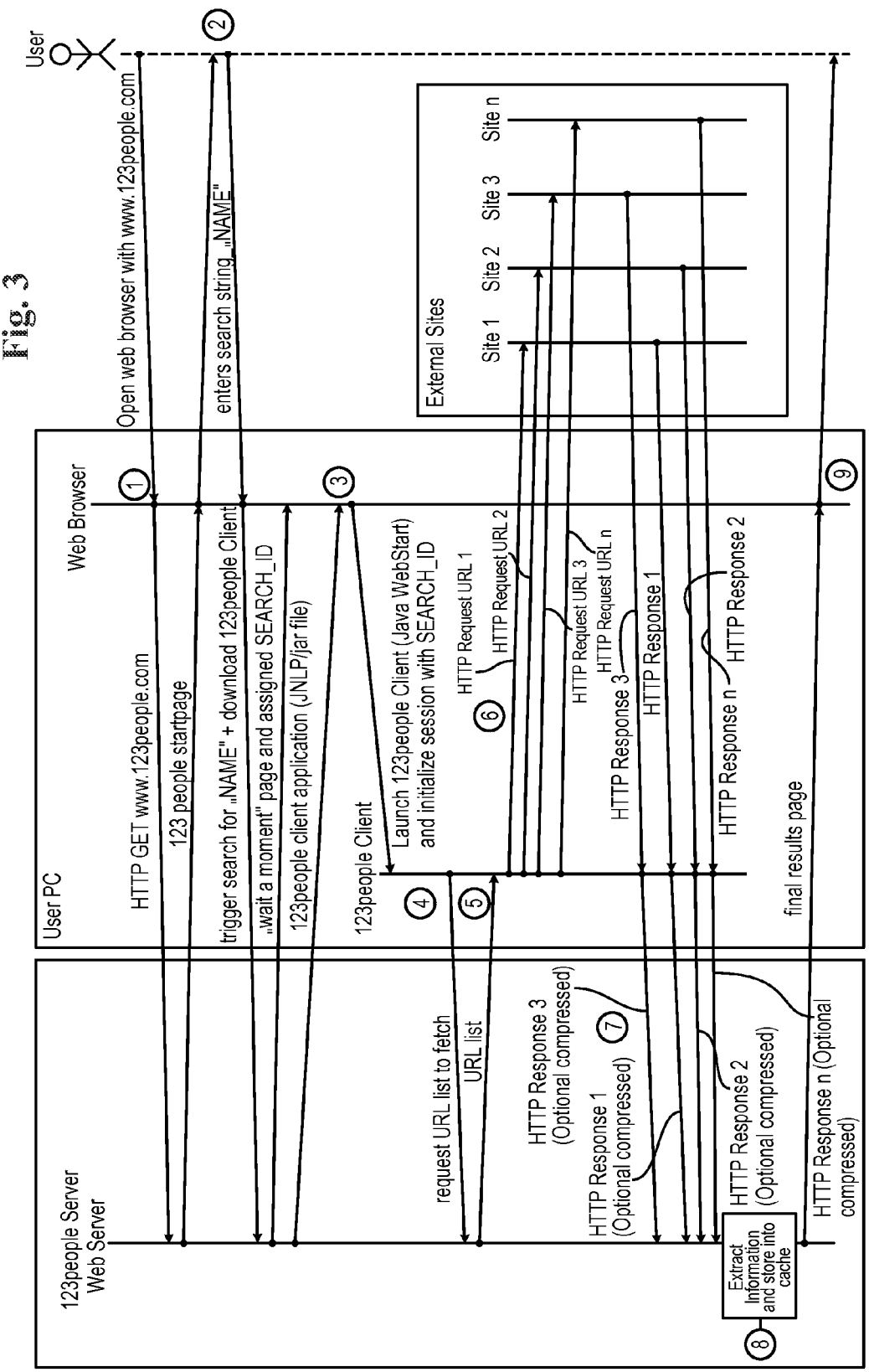
FIG. 3 depicts an exemplary process flow of the system of FIG. 1 according to one embodiment.

FIG. 3 depicts an exemplary process flow of the system 100 of FIG. 1 according to one embodiment wherein the service is provided via a web server executing on the server 106.

At the start of the process (labeled "1"), the user enters the service's server URL into the browsers destination field (i.e. http://www.123people.com), or activates the client application is suitable implementations. The web browser software (such as Microsoft Internet Explorer, Firefox, etc.) loads the server's 106 search web page.

On the search web page, there may be one or more entry fields where the user 202 enters the name of the person he wants to search for, or other search terms and/or search context. Alternatively the user 202 can select a search term, such as the name of a person, displayed on the search web page or from of a displayed list of search terms, such as a list of names of people. In embodiments where the client application includes a browser plug-in, the user 202 may select a subject, e.g. a person's name, at any other website the user 202 is visiting whereby the plug-in implements the functionality described herein. As an option, the user can enter a search context, e.g. additional information such as demographic attributes, location, school, job title, various tagged information etc. The browser program, plug-in or client application then sends the search request to the server 106. (labeled "2").

In implementations utilizing a client application, a determination is made as to whether the client device 104A, 104B, 104C has the client application or not. In the case where the client application, such as the "123people client"-software, installed on the device 104A, 104B, 104C, or the installed version is expired or otherwise out of date, the browser program or client application may also request installation or upgrade of the client application, i.e. "123people" client software, by initiating one or more requests to the server 106.

The client device 104A, 104B, 104C downloads the client application, e.g. the "123people Client," from the server 106, such as from the client application provider 114. Optionally the server 106 may assign a unique search_ID to the search request, such as for tracking purposes. The client application, such as the "123people Client" software, may be implemented using various programming languages, such as Java, C++, .net, java script, or combinations thereof and be implemented as an external application or a browser module or plug-in, as was described above. After the client application is downloaded successfully, if necessary, it is executed. (Labeled "3").

The server 106 next determined which network resources 102A, 102B, 102C, 102D should be searched for this distinct search request. For example, the server may determine the network resources 102A, 102B, 102C, 102D where it should search for a person's name via:

a) a look up in an internal table or list in the database 122, where network resources 102A, 102B, 102C, 102D are mapped, for example, to demographic criteria (i.e. the country the person is from, etc.); and b) a list of the relevant resources (URLs) could be already available within the browser environment/search page/result page, and this list of resources could be passed to the client application, such as the "123people client". In an alternate embodiment, the client application may be programmed with the identification of a set of network resources 102A, 102B, 102C, 102D that may be selected to send search requests. In one embodiment, this permits the client device 104A, 104B, 104C to execute search requests despite communications problems with the server 106. (labeled "4").

When requesting the list of network resources 102A, 102B, 102C, 102D it should search, the client device 104A, 104B, 104C, may send the server 106 unique IDs or the search string/person's name and optional additional attributes to the server 106, such as a search context, as part of the search request.

Based on the search request, the server 106 determines the best external websites, database resources or other network resources 102A, 102B, 102C, 102D to be searched, for example, by:

Looking up the search terms, such as the person's name in the database 122, such as the people search engines database, and determine whether the database 122 contains suitable, e.g. previously cached and/or non-stale, search results that may be provided to the user 202 in lieu of querying the network resources 102A, 102B, 102C, 102D, thereby avoiding unnecessary requests to those network resources 102A, 102B, 102C, 102D;

Based on a table where optional additional search attributes such i.e. the home country, etc. are mapped to a list of network resources 102A, 102B, 102C, 102D;

Based on the country where the searching person is located (based on IP address or other geo-tag); or Any kind of mathematic algorithm or database table. (Labeled "5").

The client device 104A, 104B, 104C, such as via the client application, e.g. the "123people client," then sends search requests to one or more of the identified network resources 102A, 102B, 102C, 102D, such as www.google.com, image search sites, www.live.com, www.yahoo.com, www.spock.com, www.wikipedia.org, www.youtube.com, www.ebay.com, www.itunes.com, www.yellowpages.com, www.herold.at, etc. and receives the requested information. (Labeled "6").

The search results are returned to the client device 104A, 104B, 104C from the searched network resources 102A, 102B, 102C, 102D and the collected information is sent back to the server 106. In one embodiment, the results are sent to the server 106 in compressed form. Alternatively the results are sent uncompressed. (Labeled "7").

The results are then processed as described herein. (Labeled "8").

In an alternative embodiment, the server 106 may look for information in regards to the search request that is stored or indexed in the database 122. In addition, the server 106 may requests additional information from other network resources 102A, 102B, 102C, 102D, such as www.google.com, image search sites, www.live.com, www.yahoo.com, www.spock.com, www.wikipedia.org, www.youtube.com, www.ebay.com, www.itunes.com, www.yellowpages.com, www.herold.at, or combinations thereof, and receives the results in response thereto. (Labeled "8").

These results may then be combined with the results provided by the client device(s) 104A, 104B, 104C, and/or otherwise processed, such as by combining the results with other results stored/cached at the server 106, such as in the database 122, removing duplicate results, removing irrelevant results, or combinations thereof, as described herein.

The server 106 may then create one or more result web pages, or otherwise provide the search results to the client device 104A, 104B, 104C for presentation of the search results to the user. (Labeled "9").

Figure 4:
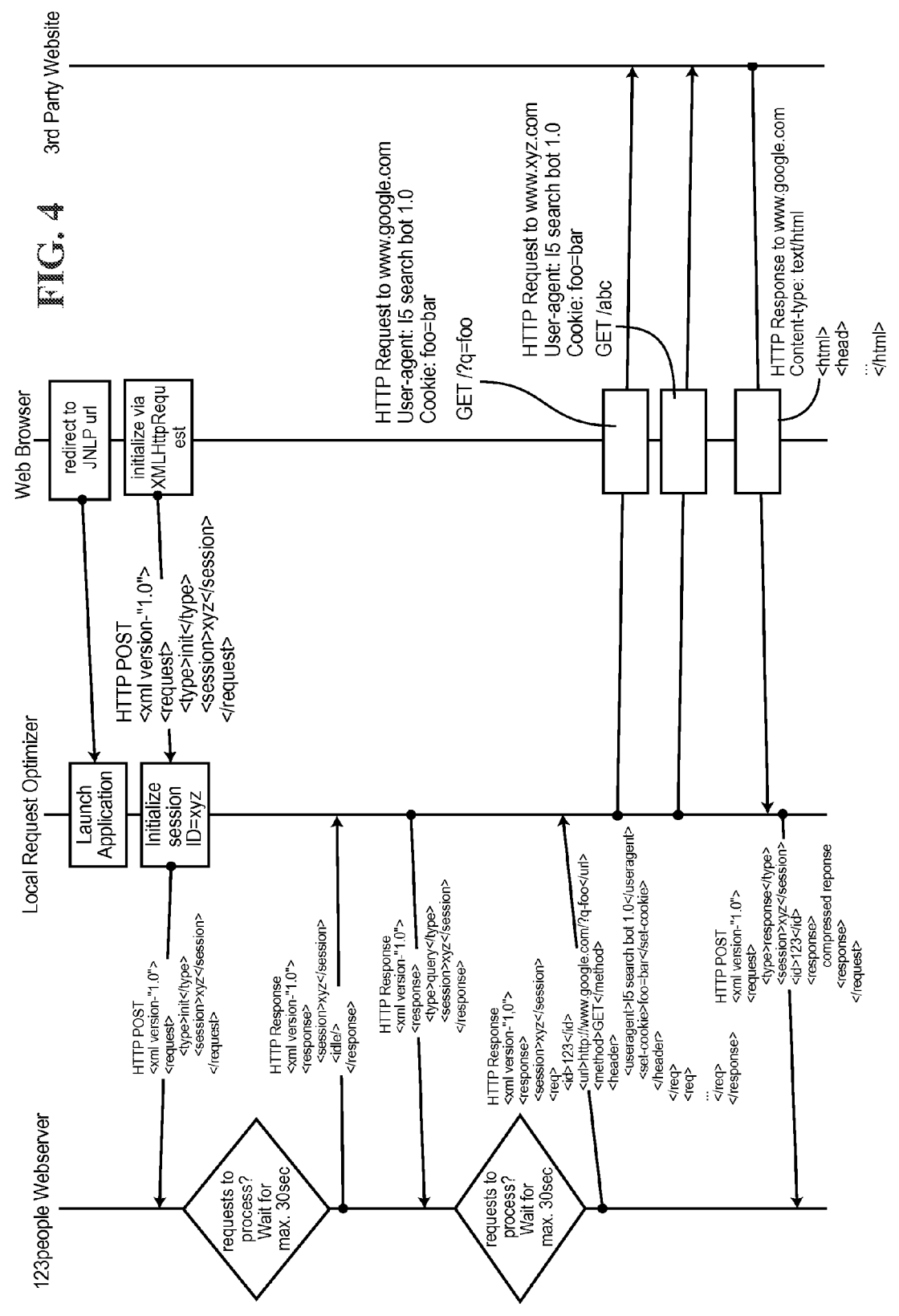

FIG. 4 depicts an alternative diagram of a portion of the process flow of FIG. 3 which shows the exemplary HTTP protocol interactions between the server 106, client device 104A, 104B, 104C and network resources 102A, 102B, 102C, 102D to implement the disclosed functionality. It will be appreciated that these interactions are merely exemplary and depend upon the implementation of the system 100.

Figure 5:
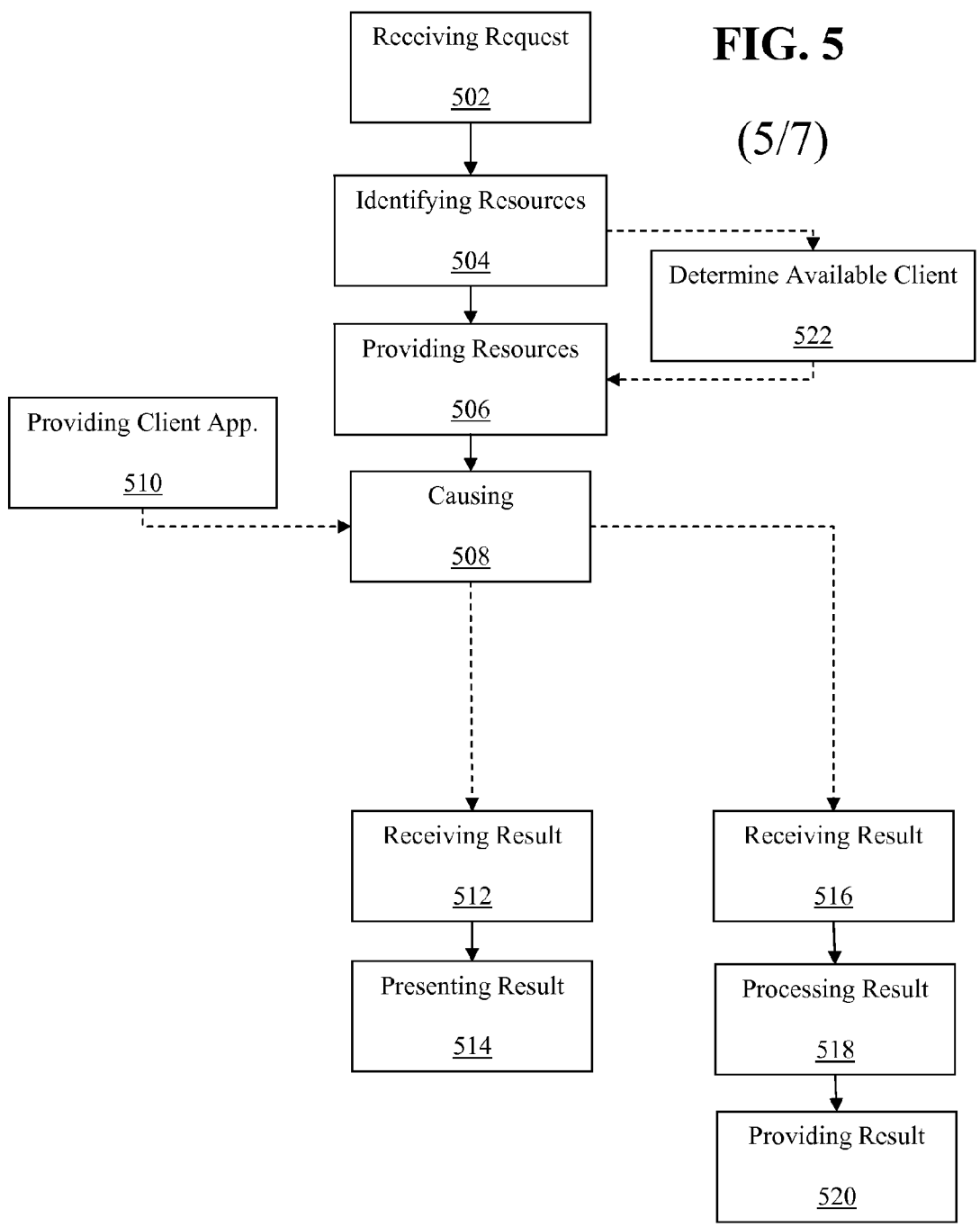
FIG. 5 depicts a flow chart showing the operations of the server of FIG. 1 according to one embodiment.

FIG. 5 depicts a flow chart showing the operations of the server 106 of FIG. 1 according to one embodiment. The process of initiating a search of at least a subset of network resources 102A, 102B, 102C, 102D includes receiving at a server 106 a request to initiate a search from a client device 104A, 104B, 104C associated with a user, the request comprising at least one search term (Block 502). In one embodiment, the receiving may further include receiving the request to initiate the search from the client application, the client application being operative to receive the request to initiate the search from the user 202. Each of the plurality of network resources 102A, 102B, 102C, 102D may include a web site, a search engine, a data repository, a human agent, the server 106, the client device 104A, 104B, 104C, or a combination thereof.

The process further includes identifying at the server 106, based on the request, a first subset of the plurality of network resources 102A, 102B, 102C, 102D to which a search request should be directed based on the at least one search term (Block 504). In one embodiment, the identifying may further include determining which of the plurality of network resources 102A, 102B, 102C, 102D are likely to provide relevant results in response to a search request for the at least one search term. In an alternate embodiment, the identifying may further include identifying a search context and determining which of the plurality of network resources 102A, 102B, 102C, 102D are likely to provide relevant results in response to a search request for the at least one search term in relation to the search context. The search context may include a geographic context, a demographic context, topical context, other context characterizing what results the user would likely perceive as relevant, or combinations thereof. In one embodiment, the search context comprises a characteristic of a people, a culture, a society, a community, a mutual interest of a people, culture, society or community, or combinations thereof. In yet another alternative embodiment, the identifying may further include modifying the at least one search term to attempt to cause the identified first subset of network resources 102A, 102B, 102C, 102D to provide relevant results in response thereto and providing the modified at least one search term to the client device 104A, 104B, 104C, the originated search requests comprising the modified at least one search term.

The process further includes providing at least a portion of the identified first subset to the client device 104A, 104B, 104C (Block 506) and causing, in response to the identifying, the client device 104A, 104B, 104C to originate a search request, based on the at least one search term, for transmission to at least one of the network resources 102A, 102B, 102C, 102D of the identified first subset (Block 508). In accordance therewith, each search request may then appear to each of the network resources 102A, 102B, 102C, 102D of the identified first subset to have been originated from the client device 104A, 104B, 104C and not the server 106.

In an alternative embodiment, the process further includes providing a client application to the client device 104A, 104B, 104C, the causing further comprising causing, by the client application, the client device 104A, 104B, 104C to originate each of the search requests (Block 510).

In another alternative embodiment, the process includes receiving a result based on the search request from each of the of network resources 102A, 102B, 102C, 102D of the identified first subset having received the search request (Block 512); and presenting each result to the user (Block 514). Alternatively, or in addition thereto, the process may include receiving at the server 106, via the client device 104A, 104B, 104C, a result based on the search request from each of the network resources 102A, 102B, 102C, 102D of the identified first subset having received the search request (Block 516); processing the received results (Block 518), wherein the processing may include modifying the results, enhancing the results, augmenting the results or combinations thereof; and providing the processed results to the client device 104A, 104B, 104C for presentation to the user (Block 520).

In yet another alternative embodiment, the process may include identifying at least one other client device 104A, 104B, 104C available to originate a search request, based on the at least one search term, for transmission to at least one of the network resources 102A, 102B, 102C, 102D of the identified first subset of network resources 102A, 102B, 102C, 102D (Block 522); providing at least a portion of the identified first subset to the at least one other client device 104A, 104B, 104C (Block 506); and causing, the at least one other client device 104A, 104B, 104C to originate a search request, based on the at least one search term, for transmission to at least one of the network resources 102A, 102B, 102C, 102D of the identified first subset (Block 508). In addition, the process may include receiving at the server 106, via the client device 104A, 104B, 104C and the at least one other client device 104A, 104B, 104C, a result based on the search request from each of the network resources 102A, 102B, 102C, 102D of the identified first subset having received the search request (Block 516); processing the received results (Block 518), as described above; and providing the processed results to the client device 104A, 104B, 104C for presentation to the user (Block 520).

Figure 6:
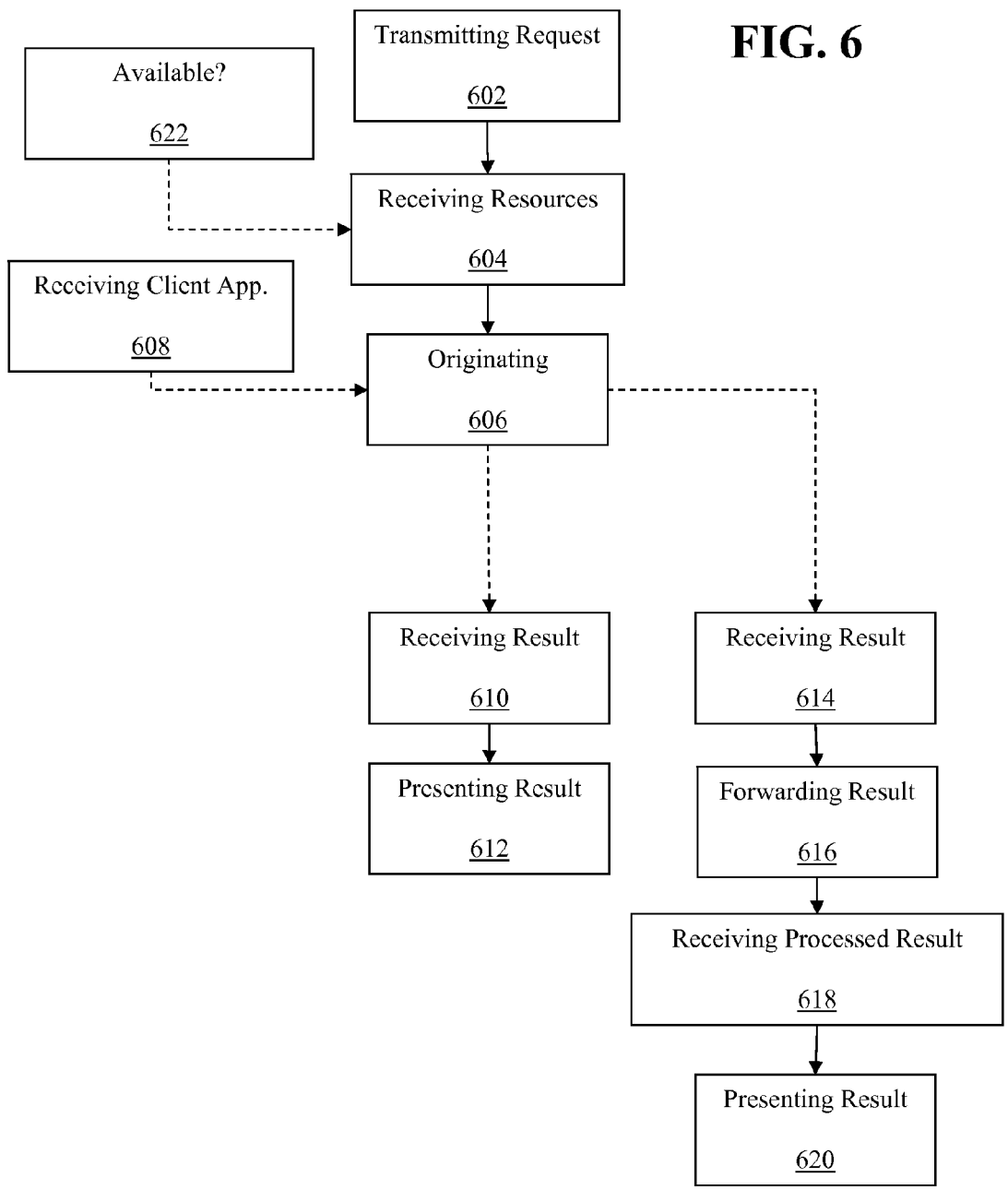
FIG. 6 depicts a flow chart showing the operations of the client device of FIG. 1, according to one embodiment.

FIG. 6 depicts a flow chart showing the operations of the client device 104A, 104B, 104C of FIG. 1, according to one embodiment. The process of initiating a search of at least a subset of network resources 102A, 102B, 102C, 102D includes: transmitting to a server 106 a request to initiate a search from a client device 104A, 104B, 104C associated with a user, the request comprising at least one search term (Block 602); receiving, from the server 106 based on the request, identification of a first subset of the plurality of network resources 102A, 102B, 102C, 102D to which a search request should be directed based on the at least one search term (Block 604); and originating, in response to the receiving, a search request, based on the at least one search term, for transmission to at least one of the network resources 102A, 102B, 102C, 102D of the identified first subset (Block 606).

In one embodiment, prior to originating the search requests, the client device 104A, 104B, 104C may receive a client application, or update thereto from the server 106, the client application implementing the functions of originating the search requests, and other functions as described herein (Block 608).

Eventually, subsequent to transmitting the originated search requests to the selected network resources 102A, 102B, 102C, 102D, the results in response to the search requests may be received by the client device 104A, 104B, 104C (block 610). In one embodiment, the results are presented to the user 202 (block 612). Alternatively, upon receipt of the search results (block 614), the results are provided/forwarded to the server 106 in compressed or uncompressed form (block 616). The server 106 then processes the results, such as by enhancing, augmenting or modifying the results, as described above and returns the processed results to the client device 104A, 104B, 104C (block 618) for presentation to the user 202 (block 620).

In an alternative embodiment, it may be determined whether or not the client device 104A, 104B, 104C is available to the server 106 for originating search requests to network resources 102A, 102B, 102C, 102D on behalf of another requesting client device 104A, 104B, 104C (block 622). Availability may be based on whether the user 202 has given authorization for such use, processing capacity or communications capacity of the client device 104A, 104B, 104C, or other factors or combinations thereof. Availability may be reported in response to a request from the server 106 or reported automatically, such as periodically or only when the status of availability changes.

In situations where the client device 104A, 104B, 104C is available, the server 106 may direct the client device to originate one or more search requests to one or more network resources 102A, 102B, 102C, 102D. In this example, the process may begin with the receiving (block 604) and end with the forwarding of received results (block 616) such that the user of the available client device 104A, 104B, 104C is generally unaware of the use thereof by the server 106. It will be appreciated that the server 106 may utilize available client devices 104A, 104B, 104C as described for originating search requests on behalf of other requesting client devices 104A, 104B, 104C or, alternatively or in addition thereto, for originating search requests on behalf of the server 106 such as to update the database 122 or otherwise crawl or index information.

In one embodiment, the system 100 may allow a user 202 to specify that a particular search request automatically recur on a periodic basis, such as via a subscription, with the server 106 detecting changes or updates to the search results and providing those changed or updated search results to the user 202.

In situations where one or more network resources 102A, 102B, 102C, 102D utilize human-interactive challenge-response tests, such as Captcha, which are designed to ensure that only humans, as opposed to automated programs, interact with the network resource 102A, 102B, 102C, 102D, the server 106 or client application may pass the challenge to the user 202 or otherwise pass the challenge to a manual or automated handler associated with the server 106.

Figure 7:
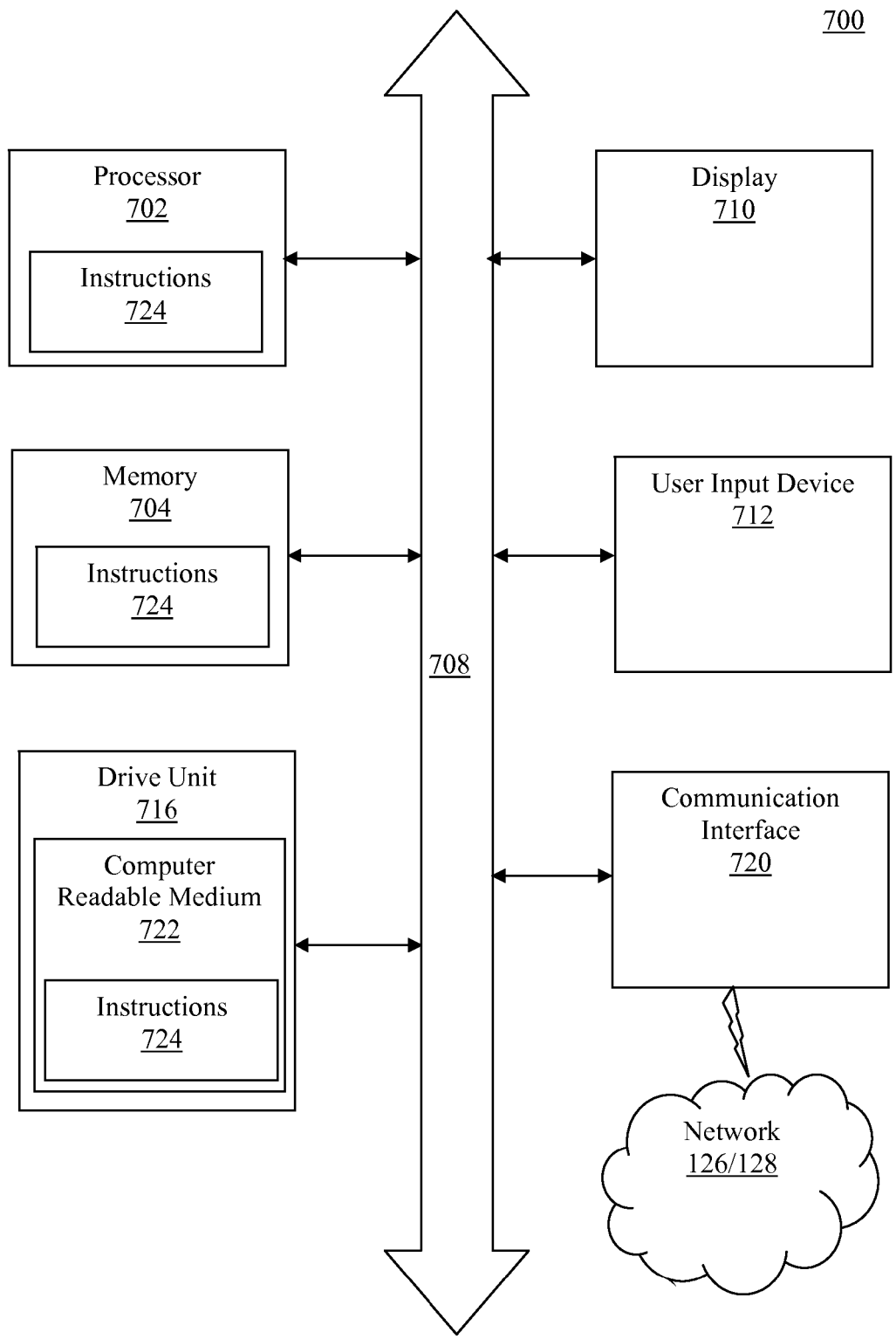
FIG. 7 depicts a block diagram of an exemplary general computer system according to one embodiment.

Referring to FIG. 7, an illustrative embodiment of a general computer system 700 is shown. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. Any of the components discussed above for the server 106, including, but not limited to the Request Receiver 108, Resource Identifier 110, Resource Provider 112, Application Provider 114, Result Receiver 116, Result Processor 118, Result Provider 120, Database 122 and/or the Available Client Identifier 124 may be a computer system 700 or a component in the computer system 700.

In a networked deployment, the computer system 700 may operate in the capacity of a server 106 or as a client device 104A, 104B, 104C in a client-server user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 704 includes a cache or random access memory for the processor 702. In alternative embodiments, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 700 may further include a display unit 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 400 may include an input device 716 configured to allow a user to interact with any of the components of system 700. The input device 716 may be a number pad, a keyboard, or a cursor control device, such as a mouse, or a joystick, touch screen display, remote control or any other device operative to interact with the system 700.

In a particular embodiment, as depicted in FIG. 7, the computer system 700 may also include a disk or optical drive unit 706. The disk drive unit 406 may include a computer-readable medium 710 in which one or more sets of instructions 712, e.g. software, can be embedded. Further, the instructions 712 may embody one or more of the methods or logic as described herein. In a particular embodiment, the instructions 712 may reside completely, or at least partially, within the memory 704 and/or within the processor 702 during execution by the computer system 700. The memory 704 and the processor 702 also may include computer-readable media as discussed above.

The present disclosure contemplates a computer-readable medium that includes instructions 712 or receives and executes instructions 712 responsive to a propagated signal, so that a device connected to a network 720 can communicate voice, video, audio, images or any other data over the network 720. Further, the instructions 712 may be transmitted or received over the network 126/128 via a communication interface 918. The communication interface 718 may be a part of the processor 702 or may be a separate component. The communication interface 718 may be created in software or may be a physical connection in hardware. The communication interface 718 is configured to connect with a network 720, external media, the display 714, or any other components in system 700, or combinations thereof. The connection with the network 126/128 may be a physical connection, such as a wired Ethernet connection or may be established wirelessly as discussed below. Likewise, the additional connections with other components of the system 100 may be physical connections or may be established wirelessly.

The network 126/128 may include wired networks, wireless networks, or combinations thereof, and may be representative of the network 126, 128 in FIG. 1. The wireless network may be a cellular telephone network, an 802.11, 802.16, 802.20, or WiMax network. Further, the network 126/128 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

It is therefore intended that the foregoing detailed description be regarded as illustrative rather than limiting, and that it be understood that it is the following claims, including all equivalents, that are intended to define the spirit and scope of this invention.

We claim:

1. A method of initiating a search of at least a subset of network resources, the method comprising:
   receiving, at a server comprising a memory and a processor, a request comprising at least one search term from a client device associated with a user, the request having been initiated by the user via the client device to initiate a search;
   identifying, by the server based on the request, a search context and one or more network resources of a plurality of network resources to which to direct a search request based on the at least one search term, the identifying of the one or more network resources comprising determining at least one network resource of the plurality of network resources that is more likely to provide relevant results than other network resources of the plurality of network resources in response to a search request for the at least one search term in relation to the search context;
   providing identification of the one or more network resources to the client device;
   causing, based on the providing of the identification of the one or more network resources to the client device without further initiation by the user, the client device to originate one or more search requests, based on the at least one search term, from the client device to the identified one or more network resources independent of the server and prior to receiving any results from any network resources of the plurality of network resources;
   receiving, at the server via the client device, a result from each network resource of the one or more network resources in response to the one or more search requests;
   processing the received result; and
   providing the processed result to the client device for presentation to the user,
   wherein the identifying further comprises modifying a search term of the at least one search term to attempt to cause the one or more network resources to provide relevant results in response to the modified search term, and providing the modified search term to the client device, the one or more originated search requests comprising the modified search term.

2. The method of claim 1 wherein the search context comprises a characteristic of a people, a culture, a society, a community, a mutual interest of a people, culture, society or community, or combinations thereof.

3. The method of claim 1 further comprising providing a client application to the client device, the causing further comprising causing, by the client application, the client device to originate each search request of the one or more search requests.

4. The method of claim 3 wherein the receiving further comprises receiving the request to initiate the search from the client application, the client application being operative to receive the request to initiate the search from the user.

5. The method of claim 1 wherein identifying the one or more network resources comprises identifying a first network resource and a second network resource of the plurality of network resources, the first network resource being different than the second network resource.

6. The method of claim 1, further comprising:
providing a client application to the client device associated with the user,
wherein the causing comprises causing, by the client application, the client device to originate the one or more search requests.

7. A server for initiating a search of at least a subset of network resources, the server comprising:
one or more hardware processors configured to:
receive a request comprising at least one search term from a client device associated with a user, the request having been initiated by the user via the client device to initiate a search;
identify, based on the request, a search context and one or more network resources of a plurality of network resources to which to direct a search request based on the at least one search term, the identification of the one or more network resources comprising determination of at least one network resource of the plurality of network resources that is more likely to provide relevant results than other network resources of the plurality of network resources in response to a search request for the at least one search term in relation to the search context;
provide identification of the one or more network resources to the client device to cause, in response to the provision of the identification of the one or more network resources without further initiation by the user, the client device to originate one or more search requests, based on the at least one search term, from the client device to the one or more network resources independent of the server and prior to receipt of any results from any network resources of the plurality of network resources;
receive, via the client device, a result based on the search request from each network resource of the identified one or more network resources in response to the one or more search requests;
process the received result; and
provide the processed result to the client device for presentation to the user,
wherein the one or more processors are further configured to modify a search term of the at least one search term to attempt to cause the one or more network resources to provide relevant results in response to the modified search term, the one or more processors being further configured to provide the modified search term to the client device, the one or more originated search requests comprising the modified search term.

8. The server of claim 7 wherein the one or more processors are further configured to provide a client application to the client device to be executed thereon, the client application being operative to cause the client device to originate each search request of the one or more search requests.

9. The server of claim 8 wherein the one or more processors are further configured to receive the request to initiate the search from the client application, the client application being operative to receive the request to initiate the search from the user and provide the request to the one or more processors.

10. The server of claim 7 wherein the one or more processors are further configured to identify, based on the request, a first network resource and a second network resource of the plurality of network resources to which to direct a search requests based on the at least one search term, the first network resource being different than the second network resource.

11. A system for initiating a search, by a client device associated with a user, of at least a subset of network resources, the system comprising:
a hardware processor operative to:
transmit a request comprising at least one search term to a server, the request having been initiated by the user via the client device to initiate a search;
receive, from the server based on the transmitted request, identification of one or more network resources of a plurality of network resources to which to direct a search request based on the at least one search term;
originate, based on the reception of the identification of the one or more network resources without further initiation by the user, one or more search requests based on the at least one search term to the identified one or more network resources independent of the server and prior to receiving any results from any network resources of the plurality of network resources;
receive a result from each network resource of the identified one or more network resources in response to the one or more search requests;
transmit the result to the server, the result being processable at the server; and
receive a processed result from the server for presentation to the user,
wherein a search context is identifiable by the server, and at least one network resource of the plurality of network resources that is more likely to provide a relevant result than other network resources of the plurality of network resources is determinable by the server in response to a search request for the at least one search term in relation to the search context, and
wherein a search term of the at least one search term is modifiable by the server to attempt to cause the at least one network resource to provide relevant results in response to the modified search term, the client device configured to receive the modified search term, the one or more originated search requests comprising the modified search term.

12. The system of claim 11 wherein the processor is further operative to receive, from the server based on the transmitted request, identification of a first network resource and a second network resource of the plurality of network resources to which to direct search requests based on the at least one search term, and
wherein the first network resource is different than the second network resource.

13. The system of claim 12 wherein the result received from the first network resource is different than the result received from the second network resource.

14. The system of claim 11 wherein the client device, responsive to the receipt of the identification of the one or more network resources, is operative to originate the one or more search requests.

* * * * *